April 2, 1940.  H. TISCHNER  2,196,163
MODULATION SYSTEM
Filed Sept. 15, 1936

INVENTOR
HORST TISCHNER
BY
ATTORNEY

Patented Apr. 2, 1940

2,196,163

UNITED STATES PATENT OFFICE 2,196,163

MODULATION SYSTEM

Horst Tischner, Berlin, Germany, assignor to Allgemeine Elektricitats-Gesellschaft, Berlin, Germany, a corporation of Germany Application September 15, 1936, Serial No. 100,846
In Germany September 27, 1935

2 Claims. (Cl. 179—171.5)

The present application concerns a novel circuit organization adapted to insure symmetric conditions in push-pull modulators and comprises reactances and non-reactive resistances arranged to balance the grid potentials of both tubes both as regards amplitude and phase.

One essential desideratum of all push-pull circuit schemes is that they should be designed with perfect symmetry. In modulator circuit arrangements in which the carrier wave is suppressed, symmetry of construction is of vital importance. Serious difficulties in this regard reside in and are occasioned by inherent distributed capacitances within the windings of the transformers. For in order to reduce leakage of transformers, the primary and the secondary windings have been sub-divided, and these sub-divisions are alternately placed on the core. This special construction of the transformers has the drawback that these sub-divisions of the coils present different capacities to ground, and this introduces dissymmetry into the whole circuit scheme. Another disturbing element and fact is that the resistances and the capacities of the grid-filament path in tubes manufactured on a large scale will never be perfectly alike inside one and the same type, and this likewise is liable to disturb or vitiate the symmetry of construction.

The object of this invention is to provide a method of and means for making the two circuits of a push-pull modulator circuit scheme perfectly alike. The idea which underlies the invention will be understood most clearly and easily by reference to the annexed drawing wherein:

Figure 2 shows the circuit of Figure 1 in bridge form; while

Figure 1:
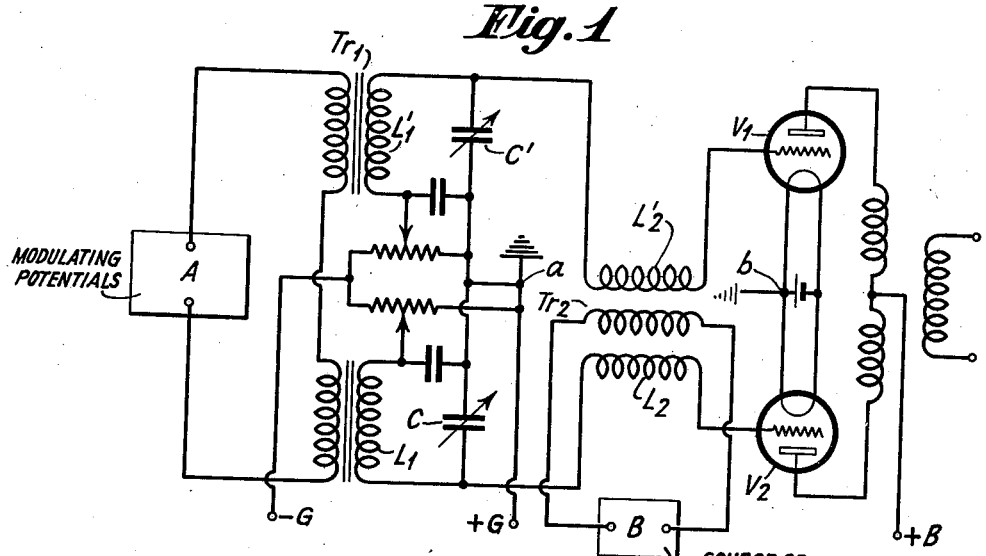
Figure 1 illustrates a balanced push-pull circuit arranged in accordance with my invention.
Figure 2:
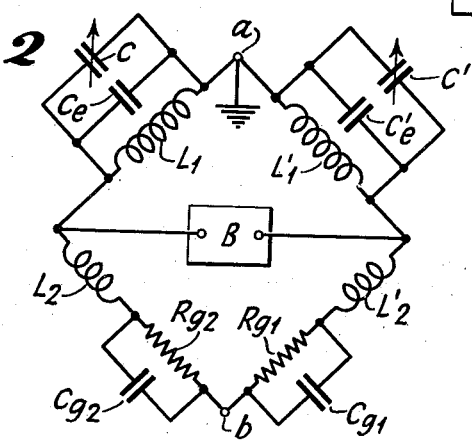

Figure 1 is an exemplified embodiment of a push-pull modulator circuit organization. The fundamental circuit diagram is shown in Figure 2. It will be clearly seen that what is here involved is a bridge-type circuit arrangement. C and C' are the balancing condensers the operation of which is to be discussed further below. $C_e$ and $C'_e$ stand for the ground capacitances of winding $L_1$ and $L'_1$ of the audio frequency input transformer $T_{r1}$. L' and $L'_2$ stand for the secondary windings of the radio frequency input transformer $T_{r2}$. The primary winding of this transformer represents the radio frequency source B. $C_{g1}$, $C_{g2}$ and $R_{g1}$, $R_{g2}$, respectively denote the grid-filament capacity and the grid-filament resistance of tube $V_1$ and $V_2$ which for manufacturing reasons fail to be perfectly symmetric. The balancing condensers C and C' have the purpose to effect a balance of the two bridge arms in such fashion that the bridge points $a$ and $b$ are at the same potential, i. e., earth potential; this means that no alternating current will flow in the connection between the filament (point $b$) and the transformer midpoint or center tap at $a$ (see Figure 1). In order that the ohmic resistances $R_{g1}$ and $R_{g2}$ may be matched to the bridge relation, the ohm resistances of the inductances $L_1$ and $L'_1$ which are not indicated in the figures, must be chosen accordingly.

Figure 3:
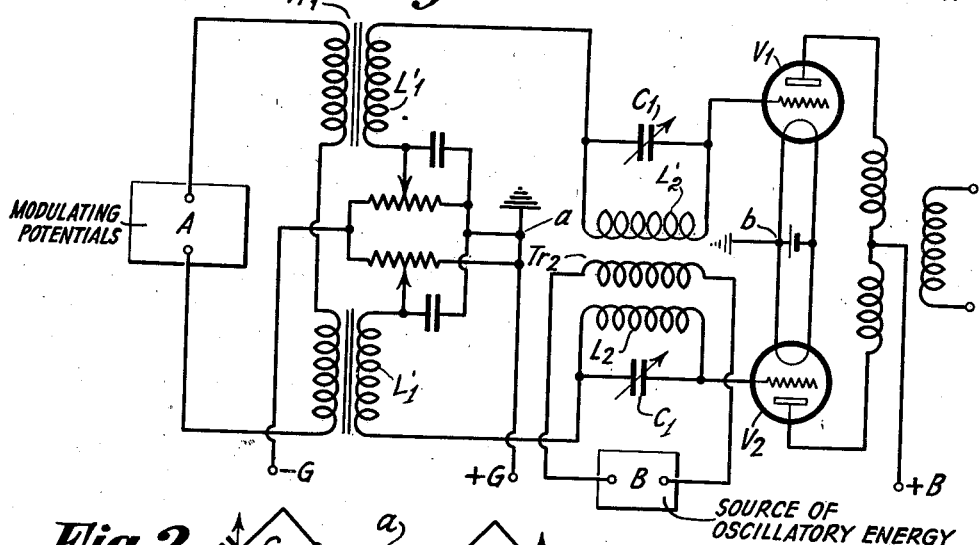
Figure 3 is a modification of Figure 1.

Fundamentally, two kinds of capacitive balance are feasible. Either the balance condensers C and C' are connected in parallel relation to the secondary windings $L_1$ and $L'_1$ of the audio frequency input transformer $T_{r1}$ as shown in Figure 1 or else in parallel relation to the secondary windings $L_2$ and $L'_2$ of the radio frequency input transformer $T_{r2}$ as shown in Figure 3. Which of the two would be more suitable and preferable is a question that can be decided only on the merits of each individual case.

I claim:

1. In a modulator circuit, a source of carrier frequency oscillations, a transformer having a primary winding fed with energy from said source and two secondary windings, a push-pull amplifier having a pair of discharge tubes, each tube having a plurality of electrodes including a control grid, input circuits each connected to one of said control grids and including one of said secondary windings respectively, means for feeding said carrier frequency energy from said secondary windings co-phasally to said input circuits, a source of modulating potentials, means for feeding said modulating potentials contraphasally to said input circuits, a separate adjustable resistor in series with each secondary winding for balancing the potentials respectively impressed on said input circuits, and means including an independently adjustable capacitance in shunt with each secondary for balancing the phases between the respective modulating potentials as impressed upon said control grids.

2. In a modulating system, a push-pull arrangement of two discharge tubes each having a plurality of electrodes including a cathode and a control grid, an input circuit for each tube connected between its cathode and control grid, a transformer having a primary winding and two secondary windings disposed in substantially balanced relation to the primary, one secondary winding being included in each said input circuit, means including a source of carrier waves connected to said primary for applying energy across said secondary windings and thence cophasally to the respective control grids of said tubes, means including a source of modulating frequency waves connected to said secondary windings for applying modulating energy contraphasally to said control grids, means including two independently adjustable capacitors, one in shunt with each secondary winding, for obtaining a compensating reactive balance between said input circuits with respect to said modulating frequency waves, and means including two independently adjustable resistors, each in series with one of said secondary windings respectively, for obtaining a compensating ohmic balance between said input circuits.

HORST TISCHNER.